Patented Aug. 2, 1949

2,477,573

UNITED STATES PATENT OFFICE 2,477,573

SYNTHESIS OF 1,4-DICYANO-2-BUTENE

Gerald T. Borcherdt, Newark, Del., assignor to E. I. du Pont de Nemours & Company, Wilmington, Del., a corporation of Delaware No Drawing. Application January 7, 1948, Serial No. 1,067

8 Claims. (Cl. 260—465.8)

This invention relates to the preparation of organic nitriles and more particularly to improvements in processes for the preparation of 1,4-dicyano-2-butene.

It has been disclosed heretofore (U. S. 2,342,101) that 1,4-dicyano-2-butene can be prepared by reacting 1,4-dibromo-2-butene or 1,4-dichloro-2-butene with an alkali metal or alkaline earth metal cyanide in an alkaline alcohol reaction medium. In the latter process, the alkaline cyanide could be produced in situ from the alkali metal hydroxide and hydrogen cyanide, but when this was done an alkaline medium was always employed. The process of U. S. 2,342,101 is inefficient, however, in that the alkaline medium causes dehydrohalogenation reactions to occur, with the formation of cyanoprene, and other compounds, by side reactions.

It has also been reported that saturated alpha, omega-dinitriles can be prepared by reacting a saturated alpha, omega-dihalide with a metal cyanide of the class consisting of sodium cyanide, potassium cyanide, cuprous cyanide, calcium cyanide and zinc cyanide in a liquid reaction medium containing, as an organic diluent, a monoalkyl ether of ethylene glycol or diethylene glycol (U. S. 2,415,261, cf. also U. S. 2,405,948), said metal cyanide being soluble in the said organic diluent. However, while the process of U. S. Patent 2,415,261 is highly effective in the preparation of saturated dinitriles, it has been found that sodium cyanide does not react with 1,4-dichloro-2-butene in the presence of ethylene glycol monomethyl ether to form 1,4-dicyano-2-butene in appreciable yields, due to the presence of the alkaline reactant in the mixture.

It has been disclosed in copending application S. N. 745,236, filed May 1, 1947, that an aqueous acidic reaction medium (which may contain minor amounts of organic solvents) has a very favorable effect upon the reaction between hydrogen cyanide and 1,4-dichloro-2-butene to form 1,4-dicyano-2-butene. Repeated attempts to employ non-aqueous solvents in the said process have generally given rise to low yields or very slow reaction rates.

An object of the invention is to provide an improved process for preparing organic nitriles, particularly 1,4-dicyano-2-butene. A further object is to provide a process for preparing 1,4-dicyano-2-butene in high yields. Another object is to provide a process whereby 1,4-dicyano-2-butene can be obtained from dichlorobutenes without the use of an aqueous acidic diluent. Other objects of the invention will appear hereinafter.

These objects are accomplished in accordance with the invention by reacting a dichlorobutene of the class consisting of 1,4-dichloro-2-butene and 3,4-dichloro-1-butene with hydrogen cyanide in the presence of a diluent of the formula $HO(CH_2CH_2O)_nR$, wherein R is hydrogen or an alkyl group having from 1 to 4 carbon atoms, and $n$ is an integer from 1 to 2 inclusive, and in the presence also of a hydrogen chloride acceptor which is substantially insoluble in the said organic diluent. Outstanding results are obtained in the process of this invention when the organic diluent is a compound of the formula $HOCH_2CH_2OR$, R having the significance set forth above. Suitable acceptors are the carbonates and bicarbonates represented by the formula $MHCO_3$ and $M'CO_3$ wherein M and M' represent alkali metals and alkaline earth metals respectively. Other insoluble acceptors which are effective include alkaline earth metal sulfates, phosphates, acid phosphates, insoluble alkali metal and alkaline earth metal salts of organic carboxylic acids, etc. In media in which the acceptor is insoluble, alkali metal phosphates, acid phosphates, carboxylates, sulfates, etc. may be employed. It is however, essential that the salt be so chosen that the reaction mixture is acidic to moist litmus paper while the reaction is in progress. Sometimes this result can be achieved by using an organic acid in combination with acceptor salts, such as sodium acetate. However, it is simpler, and generally preferable, to employ an insoluble acceptor of the formula $MHCO_3$ or $M'CO_3$ as above defined, because these substances are highly active as hydrogen chloride acceptors, without being strong dehydrohalogenating agents. In preferred embodiments the desired cyanation reaction takes place at a temperature of about 50° to 150° C. Any suitable pressure may be employed, but it is generally desirable to employ superatmospheric pressure since hydrogen cyanide exerts a relatively high vapor pressure at the preferred temperatures.

The organic diluents which may be employed in the practice of the invention include ethylene glycol, ethylene glycol monomethyl ether, ethylene glycol monoethyl ether, ethylene glycol monopropyl ether; ethylene glycol monoisopropyl ether, ethylene glycol monobutyl ethers, e. g. ethylene glycol monoisobutyl ether, ethylene glycol monotertiary butyl ether; diethylene glycol, diethylene glycol monomethyl ether, diethylene glycol monoethyl ether, diethylene glycol monopropyl ether, diethylene glycol monoisopropyl ether, diethylene glycol monobutyl ethers, e. g. diethylene glycol monoisobutyl ether and diethylene glycol monotertiary butyl ether, etc.

It is generally preferred that the hydrogen chloride acceptor be relatively finely divided, and well distributed throughout the reaction mixture, either by vigorous agitation, or otherwise.

Catalysts such as copper salts of inorganic acids, copper salts of organic acids, cobalt salts of inorganic acids, cobalt salts of organic acids, metallic copper, potassium ferricyanide, etc. may be employed advantageously in the practice of the invention but the presence of these catalysts is not absolutely essential. In general, dissolved copper-containing catalysts, such as the copper halides, are highly effective, and only relatively small amounts are sufficient, e. g. about 0.1% (or less) to 10%, based upon the total weight of the reaction mixture. Cupric and cuprous salts are equally effective.

The dichlorobutene reactant may be either 1,4-dichloro-2-butene or 3,4-dichloro-1-butene, or mixtures of the two. The mixed dichlorobutenes which are formed by processes involving halogenation of $C_4$ hydrocarbons, and which contain these two isomers, namely 1,4-dichloro-2-butene and 3,4-dichloro-1-butene, may be used efficiently in the practice of the invention. This is so because both 1,4-dichloro-2-butene and 3,4-dichloro-1-butene, upon reaction with hydrogen cyanide, yield the same dinitrile, viz. 1,4-dicyano-2-butene.

It is significant that, in general, other organic solvents cannot be employed satisfactorily in place of the glycols and glycol ethers which are required in the practice of the invention. For example, at a reaction time of 2 hours, conversions of only about 20% or less are obtained when the desired reaction takes place in the presence of anhydrous monohydric alcohols, dioxane, etc., as the organic diluent, and conversions of at least 80% are obtained when methyl glycol ether is used as the solvent in a comparative experiment at the same reaction time. The glycol ether thus has a highly specific effect, similar to the aqueous acidic diluent disclosed in S. N. 745,236.

In the practice of the present invention it is necessary to employ HCN rather than NaCN as the nitrilating agent. Methods for employing NaCN by introducing it into an acidic aqueous mixture containing the organic halide are beyond the scope of the present invention. Unless some such method is employed NaCN acts as a vigorous dehydrohalogenating agent, causing formation of cyanoprene from dihalobutenes; for example, in an experiment in which dichlorobutene was heated in a glycol monomethyl ether solvent with sodium cyanide at 100° C. in the presence of a trace of water alpha-cyanoprene was produced and the mixture was too basic for the formation of dicyanobutene as one of the main products of the reaction.

The experiment referred to in the preceding paragraph confirms a statement in the Rogers patent (U. S. 2,415,261, column 1, lines 27–26) to the effect that, in the reaction of metal cyanides with unsaturated dihalides in the presence of an ether-alcohol solvent, no improvement in yield is obtained over the extremely poor yield obtainable in the absence of such a solvent. The improved result obtained by using HCN as the nitrilating agent in the presence of the solvent and acceptor employed in the practice of this invention was therefore contrary to anything that might have been expected, based on the Rogers disclosure.

The invention is illustrated further by means of the following examples.

EXAMPLE 1

A mixture of 31 grams of 1,4-dichloro-2-butene, 50 grams of ethylene glycol monomethyl ether, 25 grams powdered calcium carbonate, 1 gram cuprous chloride and 17.5 grams of hydrogen cyanide was heated in a copper-lined reaction vessel under autogenous pressure for two hours at a temperature of 100° to 107° C. The resulting product was cooled, and diluted with water whereby the oily portion of the mixture solidified. The solidified product, freed of inorganic material, weighed 15.6 grams, which corresponds to a 60% conversion of 1,4-dichloro-2-butene to 1,4-dicyano-2-butene.

EXAMPLE 2

The following table records the results obtained in a series of experiments, each of which was similar to the experiment described in Example 1, except for the fact that the solvent, and the hydrogen chloride acceptor, was varied as indicated in the table.

*Nitrilation of dichlorobutene by reaction with HCN in the presence of a glycol or glycol ether solvent, and an acceptor which is insoluble in the said solvent*

| Run No. | Solvent | Acceptor | Conditions | Conversion to Dicyanobutene | Remarks |
|---|---|---|---|---|---|
| 1 | ethylene glycol monomethyl ether | $CaCO_3$ | 100° to 107° C./2 hours | 80% | 30% excess HCN used. |
| 2 | ethylene glycol | do | 98° to 110° C./1 hour | 69% | Do. |
| 3 | diethylene glycol monoethyl ether | $MgCO_3$ | 100° C./2 hours | 24%, yield about 40%. | |
| 4 | ethylene glycol monoethyl ether | None | 100° to 115° C./2 hours | 0% | Do. |
| 5 | do | do | do | 0% | 100% excess HCN used. |
| 6 | ethylene glycol | $K_2CO_3$ | 98° to 112° C./1 hour | 0% | Acceptor too basic. |
| 7 | ethylene glycol monomethyl ether | NaCN | 100° to 115° C./2 hours | less than 40% (oily product). | 400% excess HCN used. This illustrated the definitely inferior results obtained with NaCN as an acceptor in a nonaqueous system using a glycol ether solvent. Cf. SN 696,357. |
| 8 | methanol | $CaCO_3$ | 100° C./2 hours | 20% | |
| 9 | No solvent | do | 100° C./8 hours | 18% yield about 30%. | 300% excess HCN used as solvent. |

It is to be understood that the present invention is not limited to the specific embodiments illustrated in the foregoing examples, since many other ways of practicing the invention will occur to those who are skilled in the art. Sodium bicarbonate, for example, can be used quite satisfactorily in place of calcium carbonate in Example 1. The process may be conducted either batchwise or continuously. Any method for obtaining the desired agitation of the reactants may be employed, such as the use of turbulent flow conditions in continuous system. In the continuous process, the hydrogen chloride acceptor may be introduced at more than one point along the reaction vessel if desired, and the quantity of hydrogen halide acceptor present at any stage during the progress of the cyanation reaction may be controlled in any convenient manner. It is, of course, generally desirable to have at least a small excess of the hydrogen halide acceptor present throughout the course of the reaction, but in specific embodiments the introduction of the acceptor may be controlled so that only a very minute quantity thereof remains when the reaction is substantially complete. If desired, the cyanation reaction can be stopped, e. g. by chilling the reaction mixture, when less than all of the halogen in the dihalobutene is substituted by cyano groups. In the latter embodiment the partially cyanated product may be recovered and recycled, if desired.

In order to avoid undesirable alkalinity of the reaction medium during the course of the reaction, it is generally preferred that the glycol or glycol ether solvent be substantially anhydrous, or contain not more than about 5% of water, at least in the initial stages of the cyanation reaction. Salts which are too highly alkaline (e. g. $K_2CO_3$) cannot be employed as acceptors in the practice of this invention, even though they are virtually insoluble in the organic solvent which is employed. The small amount of water which is produced by reaction between the evolved hydrogen chloride and the hydrogen chloride acceptor is generally not sufficient to bring any substantial quantity of the acceptor into solution, hence the mixture ordinarily remains non-alkaline while the reaction is in progress. In certain instances, the reaction between the evolved hydrogen chloride and the hydrogen chloride acceptor produces a salt which is capable of forming a hydrate with the water produced by the reaction of the hydrogen chloride with the acceptor.

The 1,4-dicyano-2-butene obtained in the practice of the invention may be separated from the crude reaction product by any convenient procedure. A suitable method is to remove the inorganic salts, which are insoluble in the organic medium, by filtration, centrifuging, settling or the like, and thereafter to separate the organic diluent from the dicyanobutene by simple distillation.

The relative amounts of the reactants may be varied rather widely but it is generally advantageous to employ at least a slight excess of hydrogen cyanide over the amount stoichiometrically required. Excellent results are obtained when the initial mol ratio of HCN:dichlorobutene is from 2:1 to 20:1. The amount of organic diluent employed also may be varied over a wide range. In preferred embodiments, the amount of this diluent is from .5 to 10.0 times the weight of the dichlorobutene reactant. Larger amounts of diluent may be employed if desired, but it is generally neither desirable nor necessary to use more than about 20 parts by weight of diluent per part of dichlorobutene.

The present invention has certain advantages over processes employing aqueous acidic media in the reaction of HCN with allylic type halides (cf. S. N. 745,236), although the latter process gives outstanding results from the standpoint of high yield and rapid rate of conversion; for example, in the process of this invention, the spent acceptor can generally be separated from the final product somewhat more readily than in the process employing an aqueous acidic medium. Moreover, the present process does not give rise to the formation of the carboxylic acids and alcohols through hydrolysis of the nitrile and chloride, respectively, which are sometimes produced by acid hydrolysis of the dinitrile in processes employing an aqueous acid medium.

Since many different embodiments of the invention may be made without departing from the spirit and scope thereof, it is to be understood that I do not limit myself except as set forth in the following claims.

I claim:

1. A process for preparing 1,4-dicyano-2-butene which comprises reacting a dichlorobutene of the class consisting of 1,4-dichloro-2-butene and 3,4-dichloro-1-butene with hydrogen cyanide as the sole nitrilating agent in the presence of a hydrogen chloride acceptor of the formula $M'CO_3$, $M'$ being an alkaline earth metal, said reaction being carried out in the presence of an organic solvent of the formula $HOCH_2CH_2OR$, wherein R is a member of the class consisting of hydrogen and alkyl groups having from 1 to 4 carbon atoms, said reaction mixture containing no more than 5% of water based on the weight of the said organic solvent.

2. The process of claim 1 in which the organic diluent is ethylene glycol monomethyl ether.

3. The process of claim 1 in which the organic diluent is ethylene glycol.

4. The process of claim 1 in which a copper halide catalyst is employed.

5. The process of claim 1 carried out at a temperature of 50° to 150° C.

6. The process of claim 1 in which the weight of the organic diluent is from .5 to 20 times the weight of the dichlorobutene initially present.

7. The process of claim 1 in which the hydrogen chloride acceptor is calcium carbonate.

8. A process for preparing 1,4-dicyano-2-butene which comprises heating a mixture consisting essentially of 1,4-dichloro-2-butene, substantially anhydrous ethylene glycol monomethyl ether as solvent, the weight of the said solvent being from 0.5 to 10 times the weight of the 1,4-dichloro-2-butene, calcium carbonate in sufficient quantity to absorb the hydrogen halide formed, a catalytic quantity of copper chloride, and from 2 to 10 mols of hydrogen cyanide per mol of 1,4-dichloro-2-butene, in a reaction vessel under autogenous pressure, at a temperature of 50° to 150° C., whereby 1,4-dicyano-2-butene is produced, and thereafter separating 1,4-dicyano-2-butene from the resulting mixture.

GERALD T. BORCHERDT.

REFERENCES CITED

The following references are of record in the file of this patent:

UNITED STATES PATENTS

| Number | Name | Date |
|---|---|---|
| 1,672,253 | Giles | June 5, 1928 |
| 2,342,101 | Cass et al. | Feb. 22, 1944 |
| 2,415,261 | Rogers | Feb. 4, 1947 |
| 2,467,373 | Dutcher et al. | Apr. 19, 1949 |

FOREIGN PATENTS

| Number | Country | Date |
|---|---|---|
| 708,111 | France | July 20, 1931 |

Certificate of Correction

Patent No. 2,477,573                                           August 2, 1949

GERALD T. BORCHERDT

It is hereby certified that errors appear in the printed specification of the above numbered patent requiring correction as follows:

Columns 3 and 4, in the table, opposite "Run No. 1", under the column headed "Conversion to Dicyanobutene", for "80%" read *80%+*; same table, opposite "Run No. 4" and "Run No. 5", under the column headed "Solvent", for "ethylene glycol monoethyl ether" read *ethylene glycol monomethyl ether*; column 6, line 32, for "proceses" read *process*;

and that the said Letters Patent should be read with these corrections therein that the same may conform to the record of the case in the Patent Office.

Signed and sealed this 20th day of December, A. D. 1949.

[SEAL]

THOMAS F. MURPHY,
                                                       *Assistant Commissioner of Patents.*